Jan. 18, 1949.　　　　　H. T. BOOTH　　　　　2,459,490
THERMOSTATIC SHUTTER CONTROLLER
Filed Dec. 5, 1942　　　　　　　　　　　　　7 Sheets-Sheet 3

Inventor
Harry T. Booth,
By
C. B. Stevens
Attorney

Jan. 18, 1949.  H. T. BOOTH  2,459,490
THERMOSTATIC SHUTTER CONTROLLER
Filed Dec. 5, 1942  7 Sheets-Sheet 4

Inventor
Harry T. Booth
By
C. B. Stevens
Attorney

Jan. 18, 1949. H. T. BOOTH 2,459,490
THERMOSTATIC SHUTTER CONTROLLER
Filed Dec. 5, 1942 7 Sheets-Sheet 5

Inventor
Harry T. Booth,
By C. B. Stevens
Attorney

Jan. 18, 1949.  H. T. BOOTH  2,459,490
THERMOSTATIC SHUTTER CONTROLLER
Filed Dec. 5, 1942  7 Sheets-Sheet 7

Fig. 10

Inventor
Harry T. Booth
By J E Deringer
Attorney

Patented Jan. 18, 1949

2,459,490

UNITED STATES PATENT OFFICE 2,459,490

THERMOSTATIC SHUTTER CONTROLLER

Harry T. Booth, Glencoe, Ill., assignor to United Aircraft Products, Inc., Dayton, Ohio, a corporation of Ohio Application December 5, 1942, Serial No. 467,993

5 Claims. (Cl. 257—2)

This invention relates to a thermostatic shutter controller, particularly for oil coolers and conditioners in lubrication systems of the type employed in connection with airplane engines.

As in my application for Thermostatic controls for lubrication systems, filed July 29, 1942, Serial No. 452,763, now Patent No. 2,433,420, dated December 30, 1947, the present invention relates to airplane engine lubrication systems in which a main pressure pump is employed in the oil supply conduit leading from an oil supply tank to the engine for supplying the lubricating oil under pressure to the engine parts, and a scavenge pump for returning the oil through a cooling and conditioning device to the oil supply tank.

Substantially all modern aviation engines in which cooling of the oil is required, now employ a cooler inserted in the return line through which the scavenged oil is forced under pressure by a pump, and such systems are also provided with pressure relief valves to prevent bursting of the pipe lines due to congealing of the oil.

However, as set forth in my application, referred to above, sudden changes in conditions, excessive speeds as in bomb diving, and other airplane operations in accordance with present practices, the provision of such pressure reliefs in the cooling system is inadequate to take care of the abrupt changes, and even freezing of the oil. In accordance with said application provision is made for such changes by a thermostatic control of valve mechanism ahead of the cooler in the oil circulating system.

The present invention resides in providing a thermostatically controlled valve and shutter operator connected in the oil return line beyond the cooler and its warm-up jacket which operates in accordance with the temperature of the oil returned to the oil tank, and which operates to control the flow of oil through these heat exchange devices, and the shutter in accordance with the condition of the oil leaving these heat exchange devices as will be particularly defined hereinafter.

More particularly this invention resides in the combination of a thermostatically controlled valve connected with the cooler and cooler warmup jacket outlets and a controller for the cooler shutter operated by the differential oil pressures beyond said heat exchange devices through the instrumentality of a selector valve controlled by the thermostat for effecting a power operation of the shutter, and also a congealed cooler protecting element in cooperation with the thermostatically controlled valve and shutter control mechanism which although normally inactive functions independently of the thermostat in the event of a congealed cooler. In operation these various elements cooperate in effecting the control of the return of the lubricating oil to the oil tank at the proper temperature.

This invention has for an object to provide such a thermostatic shutter control device incorporating numerous improved features, whereby the construction may be simplified, made more compact and with less exposed operating parts and yet be fully responsive in operation in carrying out the required functions in such an oil circulating lubrication system.

Further objects and advantages of the invention will appear in the course of the following detailed description of the invention in conjunction with the accompanying drawings forming a part of this specification.

Figure 1:
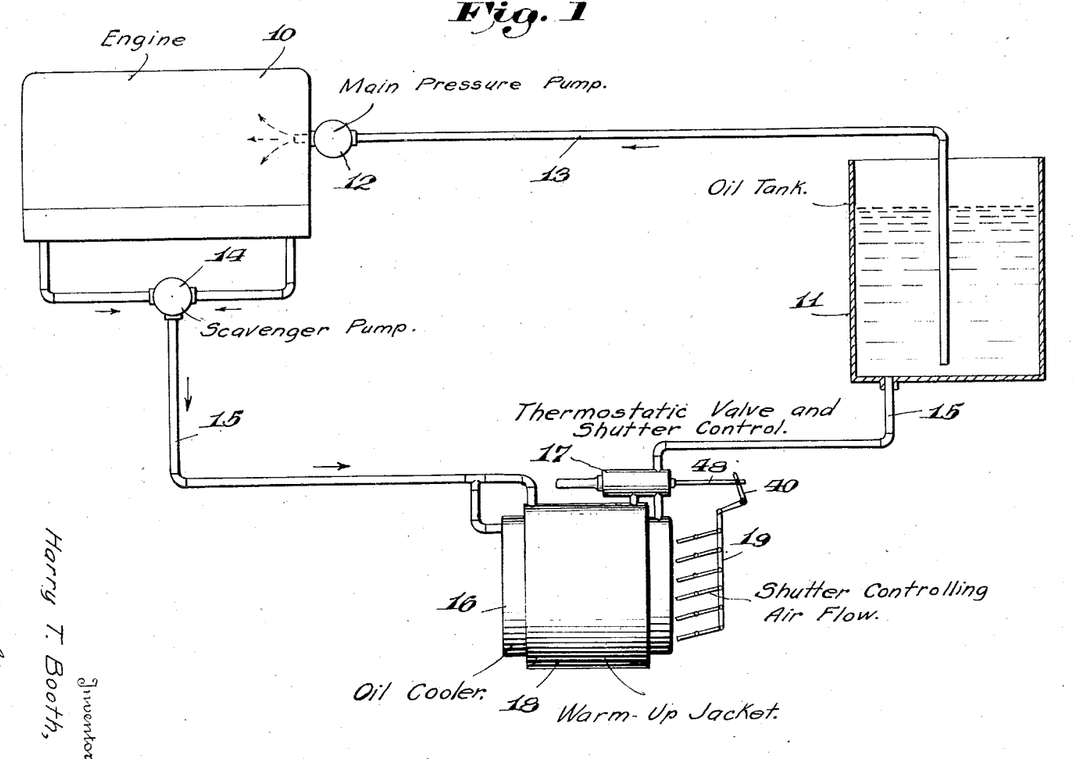
Figure 1 is a diagram of an airplane engine lubrication system employing a thermostatic shutter controller in accordance with the present invention.

Referring to the drawings, the lubrication system in general, as shown in Figure 1, includes an engine 10, which receives oil drawn from an oil tank 11, by means of a main pressure pump 12, in the oil supply conduit 13, which pump forces the oil under pressure through the various parts of the engine. The oil then collects in the sump of the engine and is drawn therefrom by a scavenge pump 14 and returned under pressure through the return conduit 15 to the oil tank.

In accordance with the present invention, return conduit 15 includes an oil cooler 16; the oil being directly conducted thereto and to a warm-up jacket 18 of the cooler so that the flow of oil from the scavenge pump splits, part going through the oil cooler and part through the warm-up jacket depending on the temperature and conditions of the oil in the cooler. A thermostatic control valve and shutter operating mechanism 17, to be described, is connected with the outlets of the cooler and cooler warm-up jacket and in turn has its outlet connected with the return conduit 15, for conducting conditioned oil to the oil supply tank 11. This control valve 17 controls the passage of oil through the cooler and its warm-up jacket and the air passage through the cooler so that after leaving same the temperature of the oil is substantially that of the oil in oil tank 11, and as supplied to engine by the main pressure pump 12. Thus this control valve 17 determines the conditioning of the oil to bring it to the required temperature for proper lubrication of the engine.

In regulating the temperature of the oil in its passage through the heat transfer apparatus, the control valve mechanism as stated also operates a shutter 19, for controlling the passage of air through oil cooler 16. The shutter is closed when the temperature is lower than the predetermined low value and is gradually opened as the temperature of the oil exceeds a given value until the shutter is wide open, when a predetermined high temperature of the oil is reached.

Further the control for the lubrication system includes other cooler protective elements incorporated therein and to be described in connection with a satisfactory embodiment of the invention illustrated in Figures 2 to 9 inclusive of the drawings.

The controller

Figure 2:
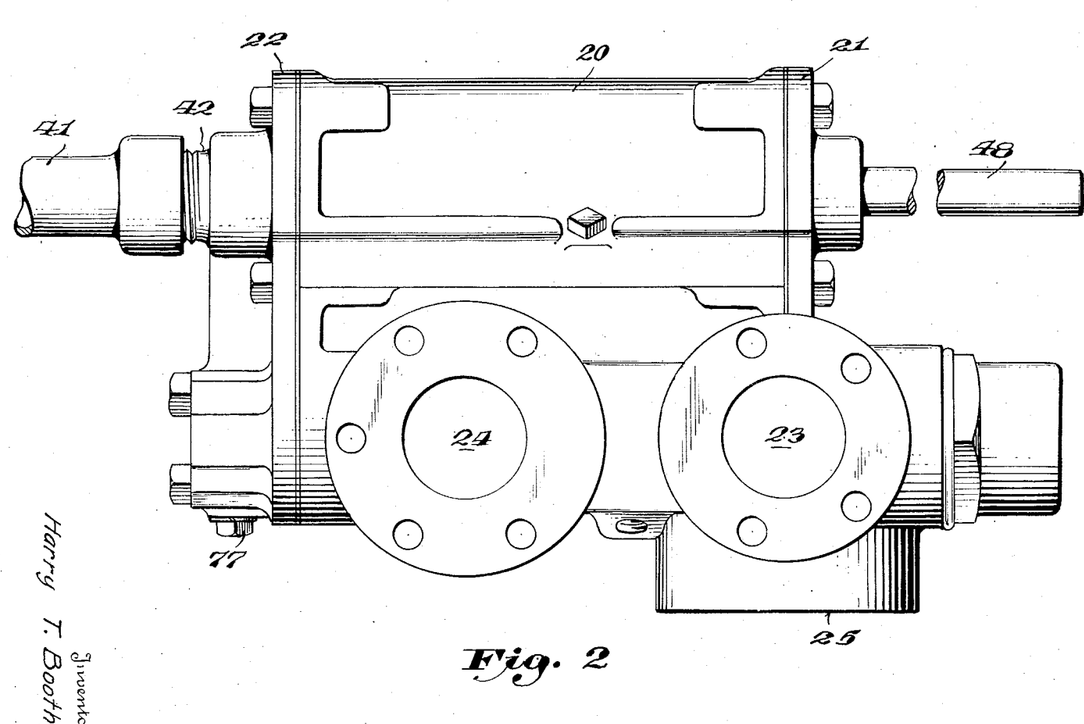
Figure 2 is a base plan view of an assembled controller in accordance with this invention.
Figure 3:
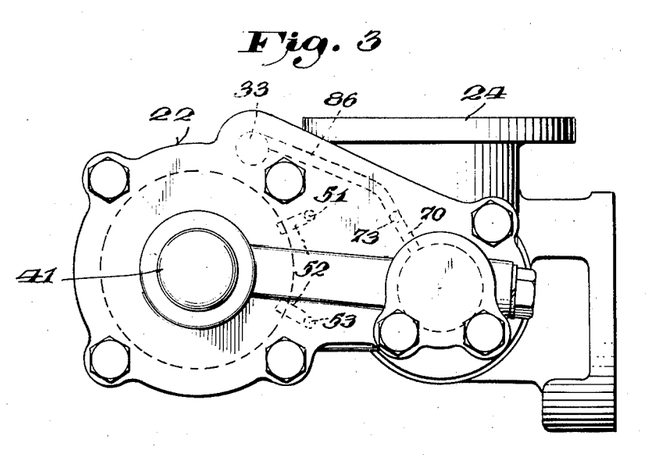
Figures 3 and 4 are respectively left and right end views of the controller illustrated in Figure 2.
Figure 4:
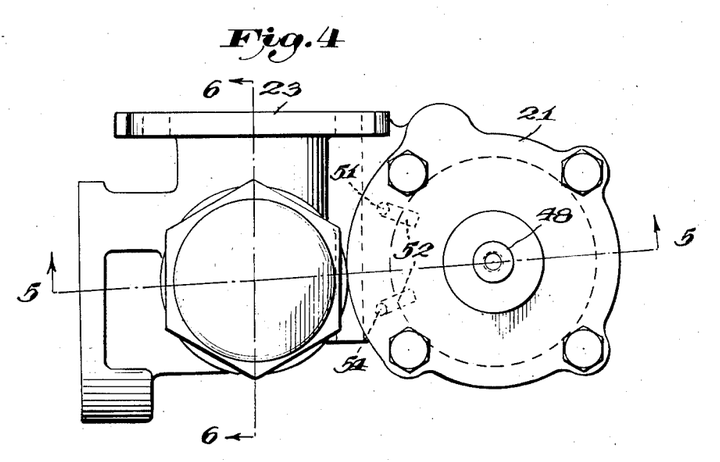

The several mechanical parts of the controller as shown in Figures 2, 3 and 4, are incorporated in a single unit; the thermostatic valve controller is assembled in a housing 20 such as a machined casting having cooperating right and left end members 21 and 22 secured thereto by bolts compressing sealing gaskets between them and the ends of the housing 20. This housing is provided with inlets 23 and 24 for connection with the cooler and its warm-up jacket respectively and an outlet 25 for connection with the conduit for returning the oil to the oil supply tank. In the following detailed description of the controller, attention will be directed to certain of the Figs. 1 to 9 as showing structure in true elevation or cross section. Additionally, and for a clearer understanding of the functional relationship of the parts reference may be had to Fig. 10 which is a diagram showing the several parts of the controller and the flow passages thereof schematically as if developed into a single plane.

Figure 5:
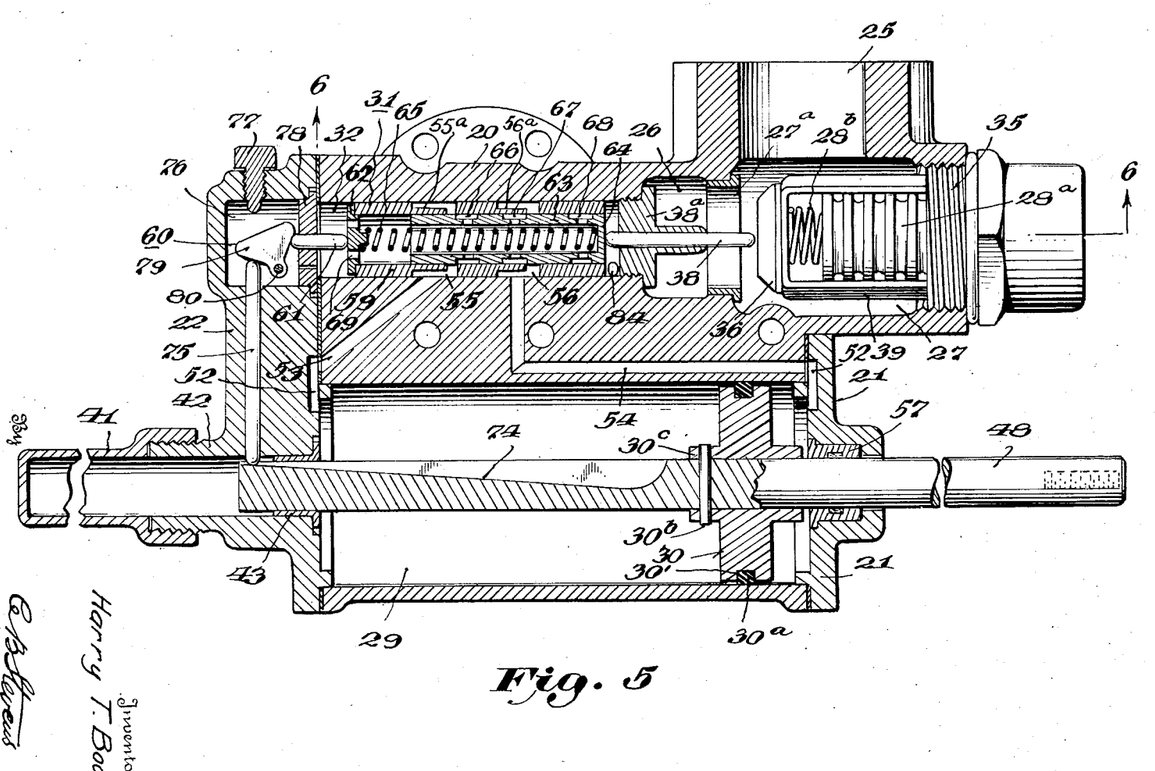
Figure 5 is a sectional view taken substantially along line 5—5 of Figures 4 and 6.
Figure 6:
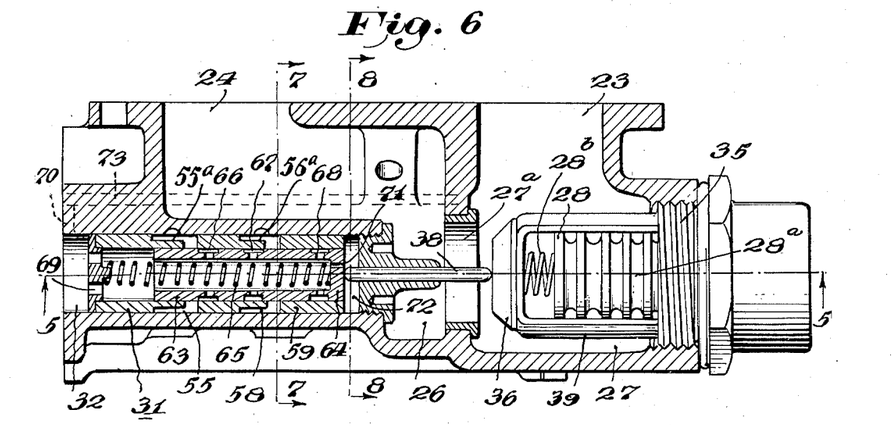
Figure 6 is a sectional view taken substantially along line 6—6 of Figures 4 and 5.

As best shown in Figures 5 and 6, inlets 23 and 24 lead to chambers 27 and 26 respectively, having a communicating port and valve seat 27a which is controlled by a thermostatic control valve 28 mounted in the housing so as to extend longitudinally in chamber 27 for cooperation with valve port 27a. The outlet 25 communicates with chamber 27 containing the thermostatic control valve 28.

Housing 20 is provided with an enlarged piston cylinder 29 (best shown in Figure 5) in which a power operating piston 30, is adapted to be reciprocated for variably regulating the position of the cooler shutters 19, from open to closed position, in response to thermostatic control valve 28 and is controlled by the actuation of a selector control valve 31. This selector control valve operates in a cylindrical valve chamber 32 extending coaxially with respect to thermostatic control valve 28 and is directly controlled thereby. Along side piston cylinder 29 is a longitudinal cylinder 33 for a valve piston 34 (Figure 9) which functions as a congealed cooler safety pressure relief. Housing 20 is also formed with ports and conduits communicating with the various valve and operating cylinders and chambers for conducting fluid thereto under pressure by the scavenge pump, and the end members 21 and 22 are formed to provide mountings and chambers for operating elements and their interconnections as will be defined in connection with the following detailed description of the various operating mechanisms.

Thermostatic control valve

Thermostatic control valve 28, as shown in Figures 5 and 6 and which functions as the main control for the lubrication system is of the fluid expanding type containing fluid of such character that it develops a large increase of pressure as the temperature increases whereby its axial length increases after the temperature reaches a given point, and thence continues to increase as the temperature increases. Its increments of expansion and contraction are lineal with precision well within tolerance limits as required for the successful operation of an airplane engine lubricating system. Being positioned in a return passageway to the oil tank, in chamber 26, receiving the oil from the heat exchange apparatus (the cooler and warm-up jacket) as it enters and comingles in chamber 26, it operates directly in response to the temperature of the oil being returned to the oil tank, and thence to the engine.

As shown, thermostatic control valve 28 has one end secured in a threaded plug 35 which is received in a cooperating threaded opening in the end of chamber 27. This provides a mounting for the thermostatic control valve whereby it extends axially in the direction of the valve port 27a and so that its opposite end 36 comprising a valve element will cooperate with valve port 27a and will operate on a push rod 38 in accordance with the oil temperature. This valve element 36 as shown is mounted on a valve cage 39 extending over the main thermostat element 28a including a spring 28b which yields under excessive fluid pressures, and which cage is arranged to be guided by the plug element into which its opposite end extends. As in application Serial No. 452,763 the thermostat may be arranged for longitudinal adjustment for operating its valve element 36 for proper cooperation with valve seat 27a and push rod 38 in accordance with the required temperature range. Such a longitudinal adjustment for the thermostat although not shown in the drawings, is preferably of the type shown in my copending application referred to herein.

Thermostatic control valve 28, as stated, responds to the oil temperatures with accuracy and with sufficient power for operating the valve element 36 for proportioning the flow of oil through the cooler and its warm-up jacket but the variations of thermostat and power thereof are insufficient to be directly utilized for operating the shutter control equipment. However, since the scavenge pump delivers the oil into the return conduit and this control equipment for the heat exchange apparatus under considerable pressure, which of course varies under varying operating conditions, such pressure on the oil afforded by the pump is utilized for operating the shutter actuating devices as controlled by the thermostat. Thus as temperature changes acting on the thermostat effect lineal movements acting on push rod 38, in accordance with the expansion and contraction of the thermostat, such movements of rod 38 are translated directly to the selector valve 31 which functions in direct response to the thermostat for controlling the flow of fluid under pressure to operating cylinder 29 for the power operation of the cooler shutter.

Shutter control

In the temperature control of heat exchange systems, since the heat dissipation from a fluid may be controlled either by governing the rate of flow of the fluid through the cooler, or by the rate of flow of air through the cooler, or both, adjustment of the shutter for the coolers for controlling the air flow is desirable if not essential. From the pure heat transmission standpoint controlling either fluid in a heat exchanger is sufficient, but as applicable in lubrication systems, particularly for airplane engines, unless the air flow is controlled, congealing of the oil may occur, causing failure of the system. Thus if only one control may be utilized, it is preferable to control the air flow.

Accordingly, as shown in Figure 1, shutter 19, which may be positioned at either the inlet, or preferably, at the outlet of cooler 16, as shown, is arranged to be adjusted for controlling the air flow. This shutter may be preferably of the Venetian blind type, the slats of the shutter being rotated at 90° to the air flow axis for complete restriction of the air and parallel to the axis for minimum restriction. This rotation is accomplished by means of a bell crank linkage 40 connected to a piston shaft 48, on which piston 30 is mounted in operating cylinder 29. Movement of the shutter is effected by the movement of piston 30, in cylinder 29, in response to the flow of fluid and differences of the fluid pressures in cylinder 29 on opposite sides of the piston 30 as directly controlled by selector valve 31.

Operating cylinder

Figure 7:
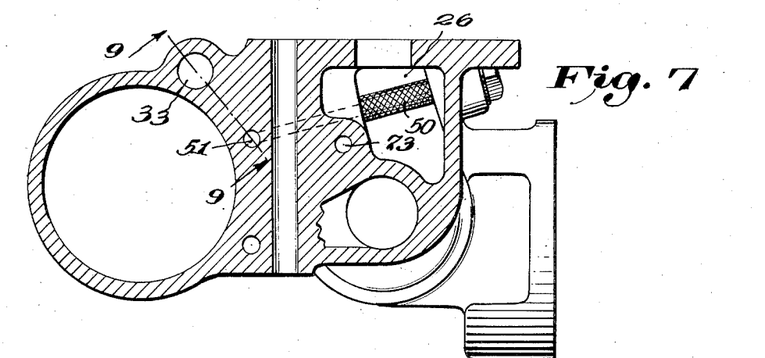
Figure 7 is a sectional view taken substantially along line 7—7 of Figure 6.
Figure 8:
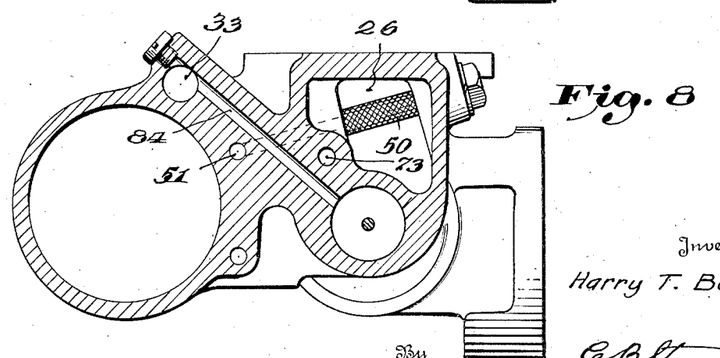
Figure 8 is a sectional view taken substantially along line 8—8 of Figure 6.
Figure 9:
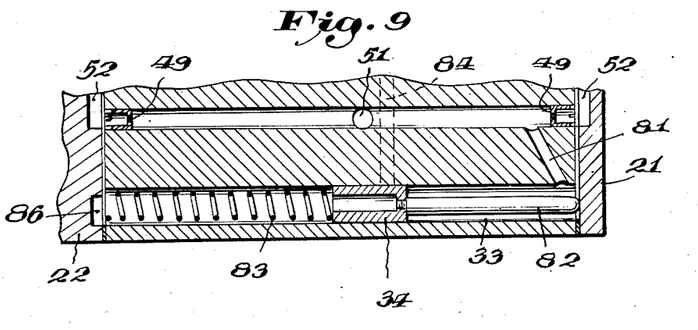
Figure 9 is a fragmentary sectional view substantially along the line 9—9 of Figure 7.
Figure 10:
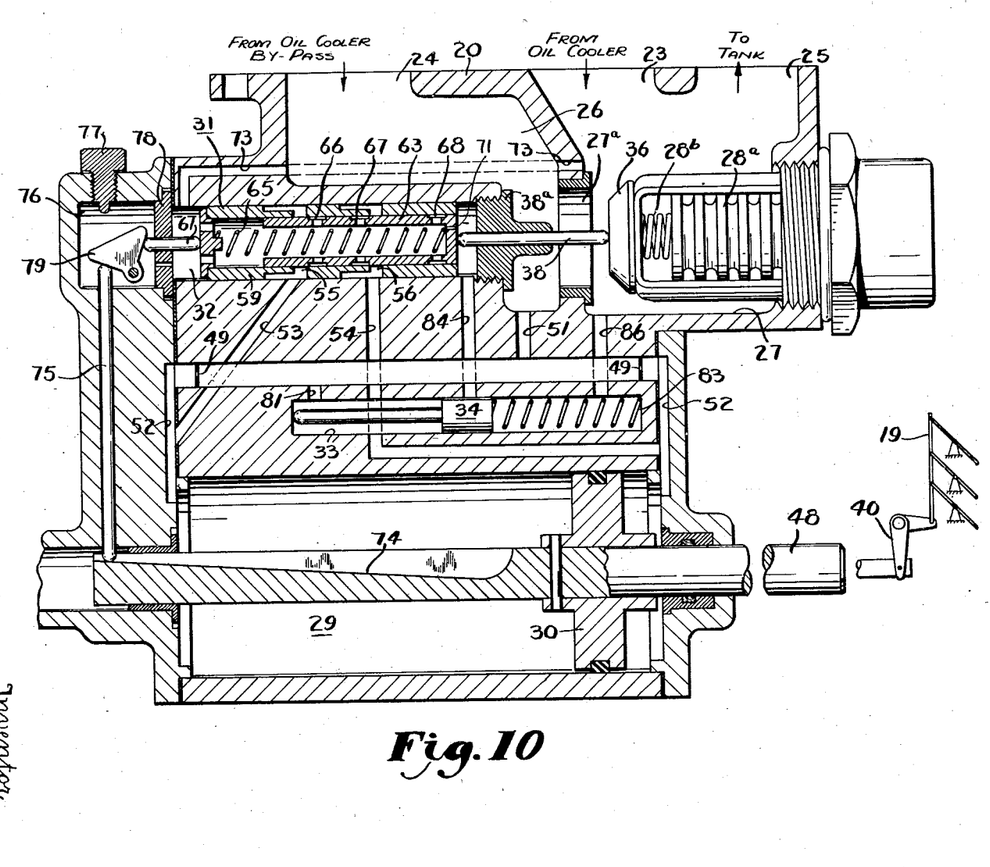
Fig. 10 is a diagrammatic view showing schematically all of the flow passages, as if developed into a single plane.

The operating cylinder 29 is provided with restricted inlet ports 49 (Fig. 9) at each end, fluid under pressure from the scavenge pump through the heat exchange apparatus being supplied thereto from chamber 26, through strainer 50, to conduit 51 (Figures 7 and 9). Grooves 52, in the end plates 21 and 22 (Figures 3 and 4) provide fluid inlets from conduit 51, and orifice restrictions 49, to opposite ends of cylinder 29, also outlets therefrom to conduits 53 and 54, leading to ports 55, and 56, respectively in a piston 59 of selector valve 31. Ports 55 and 56 occupy longitudinally spaced positions along the piston 59 and establish communication between the interior of the piston and respective peripheral annular grooves 55a and 56a. It is desirable to protect the various parts of the controller which use only a small amount of oil from contact with impurities or extraneous matter in the oil. This is accomplished by means of the strainer 50 in the inlet of the controller which furnishes oil to selective valve 31 and operating cylinder 29. Other valves such as the thermostatically controlled valve 28 cannot easily be oil screened inasmuch as they are in a path of full flow and of such a character as to make sticking difficult if not impossible.

Thus the oil under pressure is supplied to opposite ends of the operating cylinder 29, and by varying the pressures in cylinder 29, on the opposite side of piston 30, by the flow of the fluid therefrom in response to operations of selector control valve 31, piston 30 is moved in the cylinder to vary the angle of the slats of shutter 19. If the pressure in the left end is reduced by allowing flow of oil from cylinder 29, through conduit 53, and port 55, of selector valve 31; port 56, being closed, pressure increases relatively in the right end of cylinder 29, by the restricted flow of oil through orifice 49 in conduit 51, leading thereto, and piston 30, with its rod 48, moves to the left until port 55, of selector valve 31, is again closed. Movement of the piston to the right is similarly effected by opening of port 56, of selector valve 31, and the closing of port 55.

This change in the ratio of the pressure on the opposite sides of piston 30, produced by outlet flow of fluid from one end or the other of cylinder 29, thus varies the movements of this piston and is effected in direct response of conditions of the selector valve 31, which is controlled by thermostat 28.

Referring particularly to Figure 5, it will be noted that in a satisfactory construction of the operating cylinder, piston 30, has a ring groove 30', in which a suitable type of two-way piston ring 30a is mounted for cooperation with the wall of cylinder 29. A pin 30b, passes through one of the extending piston collars 30c, to retain the piston on its shaft 48, which extends through both ends of cylinder 29. A suitable shaft packing element 57 is provided in right end element 21, as oil sealing means and the left end of this shaft 48, is housed in a projecting sealing tube 41 threaded onto a nipple extension 42 projecting from end member with a bushing element 43 as a bearing therefor. This left end of shaft 48 cooperates with the operating elements of the selector valve 31 as will be described, while the right end thereof is connected with linkage 40, for controlling the opening and closing of shutter 19, as indicated in Figure 1.

Piston 30 on shaft 48 is reciprocable within cylinder 29, its stroke being limited by the ends of the piston collar elements 30c which function as limit stops for piston 30, at each end of its stroke. These collar elements 30c are of such an adjusted length that piston shaft 48 will move shutter 19 in one direction so that its slats are wide open, and in the other direction to swing the slats through 90° to their closed position. At the same time these stops are also control limits for operation of the elements actuated by shaft 48, of this operating cylinder at its other end. These piston collar stop elements also limit the movements of piston 30 somewhat within the limits of corresponding movements of adjustments of the thermostat and corresponding movements of elements of the selector valve 31 at the ends of its stroke and thereby assure an application of power to piston 30 at the ends of its stroke as will be referred to hereinafter.

Selector valve

As described in connection with the shutter, or main operating cylinder, oil outlet grooves 52, at opposite ends thereof communicate with ports 55, and 56, in a piston 59, of selector valve 31, by way of conduits 53, and 54 leading to annular grooves 55a and 56a, respectively. The ports 55a and 56a extend grooves longitudinally of the valve sleeve piston member 59 so as to afford communication with the conduits 53 and 54 for all positions of the selector valve as determined by thermostatically controlled valve 28.

The primary function of this selector valve is to follow the movements of thermostatically controlled valve 28 and effect corresponding power movements of piston 30, of an increased magnitude under fluid pressure in the main operating cylinder by controlling the pressures on opposite sides of piston 30, by allowing fluid flow from either one end or the other of cylinder 29, when such movements of the piston are required, as determined by variation of the thermostat.

As illustrated in Figures 5 and 6, selector valve 31 comprises the cylinder 32 in which the cylindrical piston 59 is adapted to be moved in accordance with movement of piston 30, by means of linkage mechanism 60 cooperating with piston shaft 48, in a manner so that a proportionate movement of piston 30, and its shaft 48, are transferred to a floating positioning pin or push rod 61. It is to be observed that the arrangement of linkage 60, as will be hereinafter described, is such as to provide a proportionate movement by this mechanism and floating pin arrangement which is exactly equal to the lineal expansion of the thermostat, when piston 30 is in a balanced position in operating cylinder 29, neglecting at this time any slippage due to load. Push rod 61 extending into selector valve cylinder 32 engages a cap 62, secured to the end of piston 59 and transfers the proportionate motion to this piston.

Inside piston 59, is another piston 63, whose motion is controlled by push rod 38, one end of which rests against cap 64, integrally secured to the end of piston 63, and the other end of which rests against the valve element 36 of thermostatic control valve 28. Push rod 38 is supported in a close-fitting central aperture through a plug 38a threaded into the end of cylinder 32 providing a substantial fluid seal between the cylinder and chamber 26. A spring 65 cooperating with the two pistons 59 and 63 tends to separate outer piston 59, and inner piston 63 in a manner to maintain contact between the various elements, i. e., thermostatic valve 28, push rod 38, piston cap 64 of piston 63, spring 65, piston cap 62 of piston 59, push rod 61, linkage mechanism 60 and shutter piston shaft 48 (except for protective action hereinafter set forth).

As stated, high pressure oil is conducted through passageways restricted by ports 49 (Fig. 9) to the ends of operating cylinder 29, and from these ends through conduits 53, and 54, to ports 55, and 56, respectively in selector valve outer piston 59. The ports 55 and 56 are in continuous communication with the conduits 53 and 54 by reason of the intermediate elongated grooves 55a and 56a.

Inner piston 63, has three outer grooves 66, 67, 68, through which ports are drilled to the inside of piston 63. Grooves 66, and 67, are so spaced that the distance between their outer edges is slightly less than the minimum distance between the sides of ports 55, and 56, in piston 59, and the distance between inner edges of grooves 66, and 67, is slightly greater than the diameter of ports 55. Groove 68, is so located that when ports 55 are covered by the piston cylinder wall between grooves 66, and 67, port 56 is open to groove 68.

Outer piston 59, has its cap 62, drilled to provide a plurality of apertures 69, to permit free passage of oil to an outlet 70 (Fig. 6), which communicates with a fluid conduit 73 conveying the oil to the outlet 25 where it mingles with the oil passing the thermostat control valve 28.

Inner piston cap 64, has an orifice port 71 (Fig. 6) affording communication between the interior of piston 63, and a chamber 72, at the end of valve chamber 32, which port permits a restricted flow therethrough as determined by the pressure differential across this orifice, and under normal preoperation permits equalizing of the pressures.

Figure 5A:
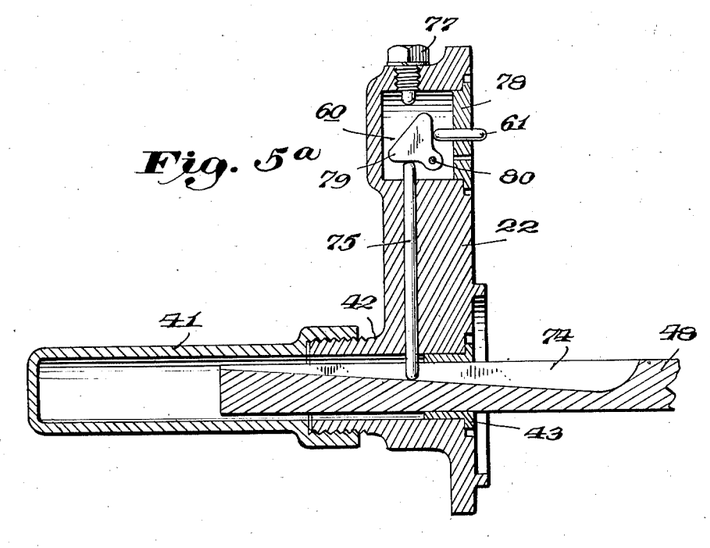
Figure 5A is a fragmentary sectional view illustrating parts shown in Figure 5 in another operated position.

A practical and highly satisfactory construction of linkage mechanism 60, for operating push rod 61, by operating cylinder shaft 48 is preferably of the construction shown in Figures 5 and 5a the latter of which illustrates the cooperation of the parts when shaft 48 is moved partly to the left and the shutter in a corresponding part-way closed position. Accordingly shaft 48 is provided with a milled sloping cam surface 74 which is engaged by a push rod 75 constituting one of the elements of the linkage mechanism 60. This rod is slidably mounted in a drilled passageway therefor in end element 22 which houses it. End element 22 is provided with a chamber 76 into which the other end of rod 75 projects and an exterior clean out opening in axial alignment therewith is sealed by means of a plug 77. Push rod 61 also extends into this chamber, projecting through an apertured guide disk 78 and the ends of these two rods 61 and 75 engage a rocking lever element 79 mounted on a pivot 80 in chamber 76. This lever mechanism affords a proportionate movement of outer piston element 59 of selector valve 31 in accordance with a factor of the movement of the piston 30 for following the lineal expansion of thermostatic control valve 28.

This ratio of movement of selector valve 31 to the movement of piston 30 may be otherwise varied, by changing the relationship of the levers, employing a thermostat having a greater or lesser degree of expansion, or otherwise amplifying the movement of the thermostat element.

In the operation of the selector valve 31, it will be noted that the walls of pistons 63 and 59, operate as slide valves. When thermostatic valve 28 is heated so as to effect a movement of push rod 38 (to the left) piston 63, is moved therewith so that ports 55, and groove 66 are lined up. This permits oil to escape from the left end of operating cylinder 29, the outlet from the right end being blocked. Due to this flow of oil therefrom, the pressure in the left end of cylinder 29 is reduced and the greater pressure in the right end and flow of oil under pressure thereto through the inlet conduit restricted by its inlet orifice 49, piston 30, is moved to the left accordingly. As piston 30, and its shaft 48, are moved to the left, lever mechanism 60, and push rod 61, are moved permitting piston 59 to slide to the left. This motion continues until the left outlet 55 closes, at which time the flow of oil from the left end of operating cylinder 29 is stopped and the pressure on the two sides of piston 30, are balanced and piston 30, is thus retained in the position in accordance with the position of the selector valve 31 in its cylinder. When the oil temperature drops, thermostatic control valve 28 contracts and a similar reverse operation of selector valve 31, takes place, i. e., when thermostat contracts, push rod 38, and piston valve 63, follow it moving to the right so that groove 67, and port 56, are lined up and port 55, is blocked, thus allowing a flow of the oil from the right end of operating cylinder 29, and creating an increase in the pressure in the left end of the cylinder to move piston 30, and its shaft 48, to the right until push rod 61, moves outer piston 59, far enough to the left to again close port 56, at which time the oil flow ceases, and the pressures on opposite sides of piston 30 are equalized and piston 30, and its shaft 48, are maintained in the position corresponding with the position of the selector valve.

Thus it will be seen that the selector valve mechanism controls the fluid flow from the ends of operating cylinder 29, to determine the position of the operating cylinder piston 30, and its shaft 48. Operating cylinder 29, is of considerable diameter so that relatively small differences of pressure on opposite sides of piston 30, will result in the creation of sufficient power for operating equipment, as may be required. Such differential pressures are variable according to the load and varying increments of movement of the selector valve piston members with respect to each other. The maximum power of the operating cylinder is dependent upon the ratio of the differential pressures of the oil passing the cooler and its jacket into the chambers 27 and 26 respectively thereby setting up differential pressures in the chambers on opposite sides of valve element 36 and its valve seat 27a. The speed of operation of piston 30, is dependent upon the rate of flow through the inlet orifice at one end of the operating cylinder, and is affected by the rate of flow from the other end of the cylinder which is restricted accordingly to the effective orifice through the selector valve resulting from a movement of one of its piston valve elements with respect to the other. Therefore the maximum speed of operation of piston 30, is dependent primarily upon the size of the operating cylinder inlet orifice. Under normal operation, and the temperature control by the thermostat, the ratio of the inlet and variable outlet orifices is such as to afford a slow movement of piston 30, as the oil temperature increases, or decreases—the rate of movement being limited by the restricted fluid outlet orifice in the selector valve due to a movement of one piston valve element with respect to the other as effected by a slight temperature change, or slowly rising or falling temperature. When the selector valve is actuated so that a port in piston 59, is wide open into a groove in piston 63, as may occur in some instances, in a sudden variation of temperature of the oil, this provides a substantially unrestricted outlet for the oil from one end of operating cylinder 29, and a maximum piston speed movement is attained by the pressure in the opposite end, being limited only by the size of the inlet orifice 49.

In practice, owing to load, or varying loads on the piston in the operating cylinder, varying ratios of differential pressures on opposite sides of piston 30, may be required which results in a slippage requiring a relative displacement of the selector piston valve with respect to each other from their neutral or port-closing positions varying in magnitude in accordance with load changes. Therefore, since the inner piston 63, of the selector valve travels with the thermostat, the outer piston 59 should travel slightly less, so that at the extremes there is sufficient area in the open port 55 or 56 to provide enough pressure differential to overcome any reasonable load that is applied by the shutter and/or other devices operated by the operating cylinder.

*Congealed cooler protection*

A condition which may arise, and for which a compensating provision must be made, is that of a congealed cooler. Since the cooler core is always full of oil, and since at times there is not sufficient circulation therethrough to maintain a normal working temperature, it is possible for this contained oil to cool off to a temperature below its pour point, and even to freeze solid.

The desired compensation then is to:

1. Apply as high a pressure differential across the core as is practical, and
2. Stop all the air flow through the core until circulation is established.
3. Make this compensation in (1) and (2) independent of the temperature of the thermostat.
4. When a proper flow has been established through the cooler, remove compensation, putting the control back to its normal responsiveness to the thermostat.

In carrying out these objectives, it is to be noted that since the pressure differential across the cooler core depends upon both quantity of oil flow and its temperature, there is a very considerable variation of pressure for normal operation. However, there is a maximum pressure which is not exceeded when conditions are normal. But for an abnormally low temperature of the oil in the cooler, a very high pressure is developed even for no flow.

Under such conditions, the oil temperature through the warm-up jacket increases and the thermostat is operated tending to close the thermostatic control valve 28 and thereby increase the pressure both on the cooler and in the warm-up jacket. This increase in pressure is conveyed from chamber 26 through strainer 50 to conduit 51 and this additional pressure is also conveyed by a conduit 81 (Figure 9) to cylinder 33 where it acts on valve piston 34 for the congealed cooler safety pressure relief.

In construction this piston 34 is provided with a stem 82 which is normally held in engagement with end element 21 by a compression spring 83 between the other end of piston 34 and end element 22. In this position, piston 34 covers a port 84 (Figures 8 and 9) communicating with chamber 72 at the end of cylinder 32 of the selector control valve 31.

Valve cylinder 33 has a down stream vent port at its end comprising a slot 86 in end element 22 communicating with conduit 73 (Fig. 3), and under normal pressure operating conditions therein, valve piston 34 covers a port 84. Valve piston 34 opens moving to the left against the pressure of a spring 83, when the pressure reaches a predetermined high value (considerably above any normal pressure to be expected), and when this valve opens, it permits high pressure oil to flow into the chamber 72 through port 84. Since the only other outlet from this chamber 72 is the small orifice 71 in piston 63, a pressure difference is created between the right and left sides of cap 64, of piston 63. If this pressure difference times the effective piston area, exceeds the strength of the spring 65, piston 63 will move to the left. This arrangement is such that if this motion continues grooves 68 will communicate with port 56, and port 55 will be closed. Hence, as has been shown, the pressure to the right of shutter or control cylinder piston 30 becomes less than the pressure to the left and piston 30 moves clear to the right. This results in a completely closed shutter as long as the cooler pressure exceeds a predetermined amount.

When this protective relief valve is subjected to high pressure its piston 34 moves to the left, uncovering the port 84 which causes the shutter to close. Further, as stated, the thermostatic valve is closed with the valve element 36 engaging the valve seat 27a. This position of the thermostatic control valve 28 normally means that all the scavenged oil goes through the cooler, but since the cooler is blocked by congealed oil, the pressure is built up until the spring 28b in the thermostatic control valve yields to allow valve element 36 to move from the valve seat 27a providing a relief valve to permit the oil to flow through to the outlet by way of the warm-up jacket of the cooler.

Hence by the above described protective mechanism, the compensation desired is accomplished as follows:

1. The high pressure across the cooler created by the thermostatic control valve 28 in holding valve element 36 closed on the port valve seat 27a.
2. The shutter is closed by the high pressure moving the center selector valve piston 63 to the extreme left.
3. The thermostatic control valve 28 is not in contact with the selector valve during this period.
4. When the cooler pressure decreases to the point where the piston 34 in the protective relief valve cylinder 33 covers the port 84, the center selector piston 63, moves back to the right until it again engages the thermostat push rod 38, and the spring 28b in the thermostatic control valve moves the valve element 36 to its normal position, thus restoring all parts to their normal positions.

It is to be understood that the form of the invention herein shown and described, is to be taken as but one example or illustrative thereof, and that various changes in shape, size and arrangement or combination of parts may be resorted without departing from the spirit of the invention, as falls within the scope of the following claims.

What is claimed is:

1. A controller for scavenged oil from an internal combustion engine which is returned to an oil reservoir under pressure, comprising, a thermostatically controlled valve beyond the cooler and its warm-up jacket for controlling the proportion of oil flow through a cooler and its by-pass warm-up jacket in the returned flow to the reservoir, means for controlling the passage of air through the cooler, an operating cylinder having a piston therein for operating said air controlling means, means for operating said piston in the operating cylinder by the passage of the scavenged oil under pressure into opposite ends of the operating cylinder and controlling the flow of the oil therefrom, said oil flow control means including a longitudinally movable selector valve composed of two elements, a connection between one of said selector valve elements and the operating cylinder piston whereby the two members are proportionately moved with respect to each other, means for moving the other member by movements of said thermostatically controlled valve in accordance with the temperature of the scavenged oil as it is returned to the reservoir, and interacting means between the two members of the selector valve whereby the first-named member will follow the movements of said second member in response to passage of oil therethrough from one end or the other of the operating cylinder.

2. In an oil temperature regulator or like device, a heat exchange section wherein oil and a fluid coolant pass in heat exchange relation, a passage whereby the oil may flow in by-passing relation to said heat exchange section, a valve movable under the influence of oil temperature to close and open said passage respectively as the oil temperature increases and decreases, closure means movable to positions between open and closed for regulating the flow of coolant, control means for said closure means including a part having motion in a first sense in response to motion of said valve toward closed position to move said closure means toward open position and having motion in a second sense in response to movement of said valve toward open position to move said closure means toward closed position, and means for moving said closure means toward closed position irrespective of the position of said valve in the event of a rise in oil pressure due to congelation in said heat exchange section.

3. In an oil temperature regulator or like device, a heat exchange section wherein oil and a fluid coolant pass in heat exchange relation, a passage whereby the oil may flow in by-passing relation to said heat exchange section, a valve movable under the influence of oil temperature to close and open said passage respectively as the oil temperature increases and decreases, closure means movable to positions between open and closed for regulating the flow of coolant, control means for said closure means including a part having motion in a first sense to initiate opening movement of said closure means and having motion in a second sense to initiate closing movement of said closure means and being capable of an overtravel in said first sense to a position initiating closing movement of said closure means, means causing said part to move in said first sense in response to motion of said valve toward closed position and to move in said second sense in response to motion of said valve toward open position, and means for causing an overtravel of said part in said first sense in response to a rise in oil pressure due to congelation in said heat exchange section.

4. In an oil temperature regulator or like device, a heat exchange section wherein oil and a fluid coolant pass in heat exchange relation, a passage whereby the oil may flow in by-passing relation to said heat exchange section, a valve movable under the influence of oil temperature to close and open said passage respectively as the oil temperature increases and decreases, closure means movable to positions between open and closed for regulating the flow of coolant, control means for said closure means including a part operated by motion of said valve toward closed position in a direction to initiate movement of said closure means toward open position, said part being capable of overtravel in said direction independently of said valve to a position initiating movement of said closure means toward closed position, and means for causing such overtravel of said part in response to a rise in oil pressure due to congelation in said heat exchange section.

5. A control unit for regulating the temperature modifying action of an oil cooler which includes by-pass means and utilizes flowing air as a coolant, comprising a body having first and second chambers therein respectively in communication with the outlets of said cooler and said cooler by-pass, a body outlet in communication with said first chamber, a port connecting said chambers, a thermostat influenced by the temperature of the oil flowing from said cooler and said cooler by-pass to said body outlet, a valve acted upon by said thermostat to open and close said port in response to variations in oil temperature between predetermined values, means for controlling the passing of air through the cooler, fluid pressure actuated means for operating said last named means, a valve movable to control the operation of said fluid pressure actuated means, a connection between said first and second named valves causing said valves to move in correspondence with each other, and means responsive to the attainment of a pressure of predetermined value in said second chamber for effecting movement of said second named valve independently of said first named valve.

HARRY T. BOOTH.

REFERENCES CITED

The following references are of record in the file of this patent:

UNITED STATES PATENTS

| Number | Name | Date |
|---|---|---|
| 1,228,765 | Fekete | June 5, 1917 |
| 1,318,069 | Giesler | Oct. 7, 1919 |
| 1,860,731 | Cole | May 31, 1932 |
| 1,913,680 | McCray | June 13, 1933 |
| 1,961,343 | Donaldson | June 5, 1934 |
| 2,248,094 | Kysor | July 8, 1941 |
| 2,279,285 | Worth | Apr. 7, 1942 |
| 2,288,599 | Ramsaur | July 7, 1942 |
| 2,288,877 | Andersen | July 7, 1942 |
| 2,291,607 | Chausson | Aug. 4, 1942 |
| 2,301,665 | Dykeman | Nov. 10, 1942 |
| 2,314,937 | Hannon | Mar. 30, 1943 |
| 2,322,047 | Mormile | June 15, 1943 |
| 2,348,212 | Gill | May 9, 1944 |

FOREIGN PATENTS

| Number | Country | Date |
|---|---|---|
| 232,309 | Great Britain | Apr. 14, 1925 |
| 364,976 | Germany | Dec. 5, 1922 |
| 377,072 | Italy | Dec. 7, 1939 |
| 463,313 | Great Britain | Mar. 19, 1937 |
| 538,678 | Great Britain | Aug. 13, 1941 |